J. P. LONG.
Grain-Drill.
No. 38,495.
Patented May 12. 1863.
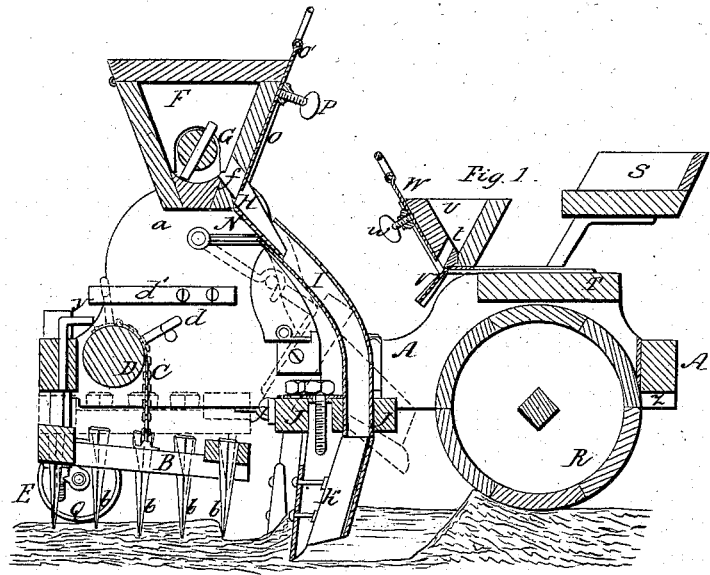
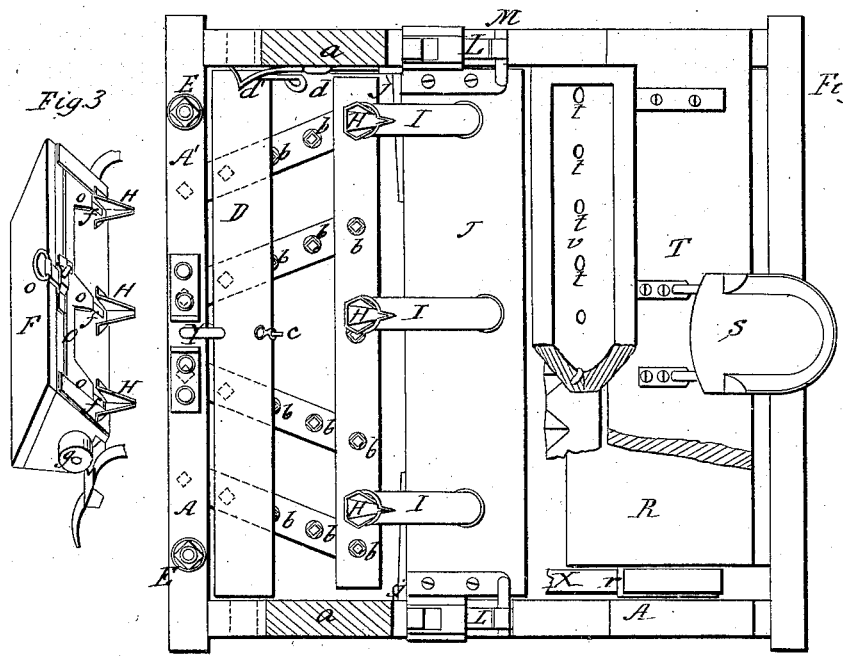
Witnesses-
Octavius Knight
Charles Smith
Inventor-
Jas. P. Long

UNITED STATES PATENT OFFICE.

JAMES P. LONG, OF OSAGE, IOWA.

COMBINED HARROW, DRILL, GRASS-SEEDER, AND ROLLER.

Specification forming part of Letters Patent No. 38,495, dated May 12, 1863.

*To all whom it may concern:*

Be it known that I, JAMES P. LONG, of Osage, in the county of Mitchell and State of Iowa, have invented a new and Improved Combined Harrow, Drill, Roller, and Grass-Seeder; and I do hereby declare the following to be a full and exact description of the same, reference being had to the accompanying drawings, making part of this specification, in which—

Figure 1 is a vertical transverse section of my improved implement. Fig. 2 is a horizontal section of the same, taken below the grain-hopper, and showing a part only of the grass-seed hopper. Fig. 3 is a detached perspective view of the grain-hopper on a smaller scale.

Similar letters of reference indicate corresponding parts in the several views.

The subject of my invention is a single combined machine adapted to perform the successive operations of harrowing, drilling grain, sowing grass-seed, and rolling with once passing over the ground. The said machine is particularly (though not exclusively) designed for tilling the lands of the Western prairies, where the great depth and lightness of the soil and the prevalence of severe winds make it an object to deposit the grain at a considerable depth and leave the ground in as compact a condition as possible. To this end I employ at the front of the machine a harrow adapted to stir and level the surface of the ground after plowing; next a set of drills penetrating a little deeper than the harrow-teeth; and, finally, a roller, which, passing last over the ground, levels, presses, and compacts its whole surface, and leaves it in the best possible condition for the permanent growth of the plants and for the subsequent operation of the reaping-machine.

In order that others skilled in the art to which my invention appertains may be enabled to fully understand and use the same, I will proceed to describe its construction and operation with reference to the accompanying drawings.

A A represent various parts of the main frame of the implement.

B is a harrow, provided with teeth *b b b*, so arranged that no two shall pass in precisely the same track, but that all together will stir and level the whole surface of the ground. The harrow B is suspended at its center by a chain, C, attached to a shaft or pulley, D, provided with a hand-lever, *d*, by which the harrow may be raised above the ground or permitted to descend to its operating position.

*d'* is a spring-catch, which engages with the lever *d* to retain the harrow in its upper position. The front of the harrow works on vertical rods E E, by which it is drawn forward when in use and guided in correct position when raised and lowered.

F is a grain-hopper mounted upon standards *a a*, and provided with a rotary stirrer, G, of common construction. The grain passes from the hopper through apertures *f* into open spouts H H, which deliver into flexible conducting-tubes I I, communicating with hollow drill-teeth K K, by which it is deposited in the ground. The drill-teeth K K are mounted in a board, J, hinged in front at *j j* to the main frame, and capable of being turned up to the position, shown in red in Fig. 1, so as to raise the drill-teeth completely clear of the ground. The board J is secured in its lower or operating position by means of bolts L L sliding over ears M M on the board and in its upper position by a hook, N, engaging with one of the said ears, as represented in red in Fig. 1.

O is a sliding gage-plate, fitted on the rear face of the hopper F, and formed with gates *o o o*, fitting the spouts H H, and adapted to close the apertures *f* entirely or to any extent desired.

P is a screw-key employed to secure the gage-plate O in any position in which it may be placed. The said key bears upon a shank, *o'*, extending upward from the gage-plate O, which shank is graduated to serve as an index or indicator of the extent to which the apertures *f* are opened.

The front of the machine is supported by a caster-wheel, Q, at each side.

R is a roller extending from side to side and supporting the rear part of the machine. Over the roller R is the driver's seat S, mounted upon a transverse board, T.

U is a grass-seed hopper, likewise attached to the transverse board T. At the bottom of the said hopper are apertures *t t*, from which the grass-seed falls upon a distributing-plate, V, of peculiar form, to scatter it uniformly over the whole surface of the ground in front of the roller. A sliding gage-plate, W, secured in any position by a clamp-screw, $w$, regulates the flow of grass-seed as may be required, or stops it altogether. The stirrer within the grass-seed hopper, if one be used, may be constructed and operated in any suitable manner. The stirrer G of the grain-hopper is rotated by an endless belt, X, extending from a pulley, $r$, on the roller to a pulley, $g$, on the stirrer-shaft. The roller is kept constantly clean by means of a scraper, Z, attached to the back of the frame A.

The roller may be made of wood or other material, two feet in diameter, the main frame being supported at a height of one foot above the ground. The entire machine may be made about six feet square, with, say, nineteen drill-teeth, arranged alternately in two ranks, one slightly in advance of the other. The grain will thus be deposited in drills four inches apart, by which means the growing plants will be made to cover the ground more completely and will keep down weeds more effectually than if the drills were more distant. The drill-teeth are made elliptical in their transverse section, and are placed edge forward, so as to adapt them to pass through the ground with less resistance, and consequently with a less expenditure of power. The teeth being narrow fore and aft also causes the displaced earth to return to the furrow more promptly and cover the grain more perfectly.

The machine is supported entirely on the roller R at back and the caster-wheels Q in front. It is thus adapted to conform freely to undulations in the ground. The team is entirely relieved of the weight of the machine. The depth of penetration of the harrow-teeth and the drill-teeth are accurately gaged, the drill-teeth being by preference permitted to penetrate a little deeper than the harrow-teeth.

Cultivator-teeth may, if preferred, be substituted for the rear rank of harrow-teeth.

The tongue is attached by means of a hook, Y, permitting it to rise and fall freely without affecting the machine, but is braced laterally so as to control the course of the machine.

A machine constructed as above described entirely dispenses with the use of gearing, the stirrer G being driven by a belt directly from the roller. The form and position of the spouts H H and the apertures $f$ of the hopper expose the delivery of the seed clearly to the view of the driver seated in his seat S. He is thus enabled to promptly detect any obstruction or difficulty in the operation of the parts, and may stop the machine, close the slide O, correct the difficulty, and again proceed.

When not in operation the harrow and drill-teeth may be elevated entirely clear of the ground, as indicated in red in Fig. 1; and in this condition the machine is adapted to be drawn upon its own wheels from field to field or upon the road to any distance with as much facility as a wagon.

The grass-seeder may be dispensed with, if preferred.

Having thus described my invention, what I claim as new, and desire to secure by Letters Patent, is—

The combined machine supported in front on wheels Q and at back on the roller R, and provided with the adjustable suspended harrow B, adjustable drill-frame J K, and seeding apparatus F G H I, all arranged and operating as and for the purposes herein set forth.

JAS. P. LONG.

Witnesses:
OCTAVIUS KNIGHT,
CHARLES SMITH.